(12) United States Patent
West et al.

(10) Patent No.: US 10,562,519 B2
(45) Date of Patent: Feb. 18, 2020

(54) SYSTEM AND METHOD FOR ENGINE DRIVELINE DISCONNECT DURING REGENERATION IN HYBRID VEHICLES

(71) Applicant: Allison Transmission, Inc., Indianapolis, IN (US)

(72) Inventors: Stephen T. West, New Palestine, IN (US); Aaron Rues, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 248 days.

(21) Appl. No.: 15/679,506

(22) Filed: Aug. 17, 2017

(65) Prior Publication Data

US 2017/0349165 A1    Dec. 7, 2017

Related U.S. Application Data

(63) Continuation of application No. 14/838,393, filed on Aug. 28, 2015, now Pat. No. 9,738,272, which is a
(Continued)

(51) Int. Cl.
*B60W 20/40* (2016.01)
*B60W 10/04* (2006.01)
(Continued)

(52) U.S. Cl.
CPC ............ *B60W 20/40* (2013.01); *B60W 10/02* (2013.01); *B60W 10/04* (2013.01); *B60W 10/06* (2013.01);
(Continued)

(58) Field of Classification Search
CPC ...... B60W 20/40; B60W 10/02; B60W 10/04; B60W 10/06; B60W 20/00;
(Continued)

(56) References Cited

U.S. PATENT DOCUMENTS 5,881,559 A    3/1999 Kawamura
5,934,396 A    8/1999 Kurita
(Continued)

FOREIGN PATENT DOCUMENTS

EP             2 062 220 B1    10/2011
KR    10-2012-0065979 A        6/2012
(Continued)

OTHER PUBLICATIONS

International Search Report and Written Opinion issued in PCT/US2014/020403, dated Jun. 18, 2014, 14 pgs.
(Continued)

*Primary Examiner* — Tuan C To
(74) *Attorney, Agent, or Firm* — Woodard Emhardt Henry Reeves & Wagner LLP (57) ABSTRACT

A system and method for operating a hybrid vehicle having an engine and an eMachine coupled by a clutch using a hybrid controller is presented. The method determines an idle fuel rate of the engine, determines a hybrid efficiency index for the hybrid vehicle, determines an expected energy storage rate increase for an operating condition where the engine is decoupled from a vehicle transmission using said clutch, multiplies the expected energy storage rate increase by the hybrid efficiency index to determine an expected fuel rate reduction of the engine in the operating condition; and decouples the engine from the vehicle transmission using the clutch if the expected fuel rate reduction is greater than the idle fuel rate.

20 Claims, 3 Drawing Sheets

Related U.S. Application Data continuation of application No. PCT/US2014/020403, filed on Mar. 4, 2014.

(60) Provisional application No. 61/783,188, filed on Mar. 14, 2013.

(51) Int. Cl.
| | | |
|---|---|---|
| *B60W 20/00* | (2016.01) | |
| *B60W 30/18* | (2012.01) | |
| *B60W 10/02* | (2006.01) | |
| *B60W 10/06* | (2006.01) | |
| *B60K 6/48* | (2007.10) | |

(52) U.S. Cl.
CPC ...... *B60W 20/00* (2013.01); *B60W 30/18127* (2013.01); *B60K 6/48* (2013.01); *B60W 2030/1809* (2013.01); *B60W 2030/18081* (2013.01); *B60W 2560/00* (2013.01); *B60W 2710/021* (2013.01); *B60W 2710/06* (2013.01); *Y10S 903/905* (2013.01); *Y10S 903/93* (2013.01)

(58) Field of Classification Search
CPC . B60W 30/18127; B60W 2030/18081; B60W 2030/1809; B60W 2560/00; B60W 2710/021; B60W 2710/06; B60K 6/48; Y02T 10/6221; Y02T 10/84; Y10S 903/905; Y10S 903/93
USPC .......................................................... 701/22
See application file for complete search history.

(56) References Cited

U.S. PATENT DOCUMENTS

| | | | |
|---|---|---|---|
| 6,126,569 A | 10/2000 | Genise | |
| 6,335,610 B1 | 1/2002 | Winstead | |
| 6,441,588 B1 | 8/2002 | Yagi et al. | |
| 6,469,403 B2 | 10/2002 | Omata et al. | |
| 6,518,732 B2 | 2/2003 | Palanisamy | |
| 6,686,724 B2 | 2/2004 | Coates et al. | |
| 6,727,676 B2 | 4/2004 | Ochiai | |
| 6,904,342 B2 | 6/2005 | Hanada et al. | |
| 6,971,461 B2 * | 12/2005 | Yamamoto | B60K 6/48 |
| | | | 180/65.25 |
| 7,009,401 B2 | 3/2006 | Kinoshita et al. | |
| 7,015,676 B2 | 3/2006 | Kohama et al. | |
| 7,021,409 B2 | 4/2006 | Tamor | |
| 7,078,877 B2 | 7/2006 | Salasoo et al. | |
| 7,131,708 B2 | 11/2006 | Tao et al. | |
| 7,295,902 B2 | 11/2007 | Chen et al. | |
| 7,305,873 B2 | 12/2007 | Hubbard et al. | |
| 7,407,026 B2 | 8/2008 | Tamor | |
| 7,449,891 B2 | 11/2008 | Cawthorne | |
| 7,479,761 B2 | 1/2009 | Okumura | |
| 7,482,767 B2 | 1/2009 | Tether | |
| 7,486,036 B2 | 2/2009 | Oyobe et al. | |
| 7,521,935 B2 | 4/2009 | Uchida | |
| 7,538,520 B2 | 5/2009 | Zettel et al. | |
| 7,550,946 B2 | 6/2009 | Zettel et al. | |
| 7,639,018 B2 | 12/2009 | Zettel et al. | |
| 7,645,209 B2 | 1/2010 | Dreibholz et al. | |
| 7,657,350 B2 | 2/2010 | Moran | |
| 7,661,370 B2 | 2/2010 | Pike et al. | |
| 7,677,341 B2 | 3/2010 | Tomo | |
| 7,719,238 B2 | 5/2010 | Iida | |
| 7,730,984 B2 | 6/2010 | Heap et al. | |
| 7,768,235 B2 | 8/2010 | Tae et al. | |
| 7,770,676 B2 | 8/2010 | Tenbrock et al. | |
| 7,770,678 B2 | 8/2010 | Nozaki et al. | |
| 7,784,575 B2 | 8/2010 | Yamanaka et al. | |
| 7,795,844 B2 | 9/2010 | Ichikawa et al. | |
| 7,800,345 B2 | 9/2010 | Yun et al. | |
| 7,828,693 B2 | 11/2010 | Soliman et al. | |
| 7,836,985 B2 | 11/2010 | Itoh | |
| 7,863,789 B2 | 1/2011 | Zepp et al. | |
| 7,865,287 B2 | 1/2011 | Huseman | |
| 7,878,282 B2 | 2/2011 | Kumazaki et al. | |
| 7,893,637 B2 | 2/2011 | Suhama et al. | |
| 7,908,064 B2 | 3/2011 | Cawthorne et al. | |
| 7,923,950 B2 | 4/2011 | Takahashi | |
| 7,928,699 B2 | 4/2011 | Kohn | |
| 7,935,015 B2 | 5/2011 | Tabata et al. | |
| 7,967,091 B2 | 6/2011 | Yamazaki et al. | |
| 7,977,896 B2 | 7/2011 | Heap et al. | |
| 7,987,934 B2 | 8/2011 | Huseman | |
| 7,998,023 B2 | 8/2011 | Holmes et al. | |
| 8,000,866 B2 | 8/2011 | Heap et al. | |
| 8,002,667 B2 | 8/2011 | Hsieh et al. | |
| 8,010,247 B2 | 8/2011 | Heap et al. | |
| 8,020,652 B2 | 9/2011 | Bryan et al. | |
| 8,022,674 B2 | 9/2011 | Miura | |
| 8,029,408 B2 | 10/2011 | Seel | |
| 8,030,883 B2 | 10/2011 | Katayama | |
| 8,035,324 B2 | 10/2011 | Heap | |
| 8,035,349 B2 | 10/2011 | Lubawy | |
| 8,047,959 B2 | 11/2011 | Fuechtner et al. | |
| 8,053,921 B2 | 11/2011 | Ichikawa | |
| 8,063,609 B2 | 11/2011 | Salasoo et al. | |
| 8,078,417 B2 | 12/2011 | Ishishita | |
| 8,082,743 B2 | 12/2011 | Hermann et al. | |
| 8,091,667 B2 | 1/2012 | Zettel et al. | |
| 8,098,050 B2 | 1/2012 | Takahashi | |
| 8,234,025 B2 | 7/2012 | Conlon et al. | |
| 8,781,659 B2 * | 7/2014 | Kim | B60W 10/06 |
| | | | 180/65.21 |
| 8,958,965 B2 * | 2/2015 | Perkins | B60K 23/08 |
| | | | 701/69 |
| 8,991,283 B2 * | 3/2015 | Fuechtner | B60K 6/448 |
| | | | 74/661 |
| 9,650,934 B2 * | 5/2017 | Pachner | F01N 3/208 |
| 2001/0033150 A1 * | 10/2001 | Kimura | H01M 10/44 |
| | | | 320/132 |
| 2002/0116101 A1 | 8/2002 | Hashiba et al. | |
| 2002/0134596 A1 | 9/2002 | Morimoto et al. | |
| 2002/0163250 A1 | 11/2002 | Huls et al. | |
| 2002/0167221 A1 | 11/2002 | Kosik et al. | |
| 2007/0090803 A1 | 4/2007 | Yun et al. | |
| 2007/0205030 A1 * | 9/2007 | Shibata | B60K 6/365 |
| | | | 180/65.28 |
| 2007/0216312 A1 | 9/2007 | Ogata et al. | |
| 2008/0189002 A1 * | 8/2008 | Egoshi | B60K 6/365 |
| | | | 701/22 |
| 2008/0224478 A1 | 9/2008 | Tamor | |
| 2008/0300743 A1 | 12/2008 | Conlon et al. | |
| 2009/0037060 A1 | 2/2009 | Carlhammar et al. | |
| 2009/0055061 A1 * | 2/2009 | Zhu | B60K 6/48 |
| | | | 701/55 |
| 2009/0118929 A1 | 5/2009 | Heap et al. | |
| 2009/0118941 A1 | 5/2009 | Heap | |
| 2009/0118964 A1 | 5/2009 | Snyder et al. | |
| 2009/0118971 A1 | 5/2009 | Heap et al. | |
| 2009/0204203 A1 | 8/2009 | Simon, Jr. et al. | |
| 2009/0277701 A1 * | 11/2009 | Soma | B60K 6/445 |
| | | | 180/65.25 |
| 2009/0308674 A1 | 12/2009 | Bhattarai et al. | |
| 2010/0116235 A1 | 5/2010 | Imamura et al. | |
| 2010/0125019 A1 | 5/2010 | Tabata et al. | |
| 2010/0250037 A1 | 9/2010 | Yoshida et al. | |
| 2010/0262308 A1 | 10/2010 | Anderson et al. | |
| 2010/0263952 A1 | 10/2010 | Richter et al. | |
| 2010/0299036 A1 | 11/2010 | Vespasien | |
| 2010/0312422 A1 | 12/2010 | Imaseki | |
| 2011/0040433 A1 | 2/2011 | Steuernagel | |
| 2011/0048823 A1 | 3/2011 | Connelly et al. | |
| 2011/0118921 A1 | 5/2011 | Park et al. | |
| 2011/0130904 A1 | 6/2011 | McGrogan et al. | |
| 2011/0301791 A1 | 12/2011 | Swales et al. | |
| 2011/0320075 A1 | 12/2011 | Kim et al. | |
| 2013/0040778 A1 * | 2/2013 | Schulte | B60K 6/48 |
| | | | 477/5 |

(56) References Cited

U.S. PATENT DOCUMENTS

| | | |
|---|---|---|
| 2013/0054107 A1 | 2/2013 | Harvie |
| 2013/0124078 A1* | 5/2013 | Yamakawa ........ G01C 21/3697 701/123 |
| 2013/0166118 A1* | 6/2013 | Kim ...................... B60W 10/06 701/22 |
| 2013/0166182 A1 | 6/2013 | Suzuki |
| 2013/0268162 A1 | 10/2013 | Ponziani |
| 2013/0332015 A1* | 12/2013 | Dextreit ................. B60K 6/448 701/22 |
| 2014/0144719 A1* | 5/2014 | Morgan ................... B60K 1/00 180/65.31 |
| 2014/0249959 A1* | 9/2014 | Ishida ................ G06Q 30/0282 705/26.61 |
| 2014/0365055 A1* | 12/2014 | Fujiyoshi ............... B60K 6/448 701/22 |
| 2015/0052987 A1* | 2/2015 | Jung .................... B60W 10/00 73/114.53 |

FOREIGN PATENT DOCUMENTS

| | | |
|---|---|---|
| WO | WO 2007/078225 A1 | 7/2007 |
| WO | WO 2012/098743 A1 | 7/2012 |

OTHER PUBLICATIONS

Machine translation dated Feb. 21, 2017 of WO 2012/098743 A1, published Jul. 26, 2012.

\* cited by examiner

SYSTEM AND METHOD FOR ENGINE DRIVELINE DISCONNECT DURING REGENERATION IN HYBRID VEHICLES

CROSS REFERENCE TO RELATED APPLICATIONS

This application is a continuation of U.S. application Ser. No. 14/838,393 filed Aug. 28, 2015, which is a continuation of International Application No. PCT/US2014/020403 filed Mar. 4, 2014, which claims the benefit of U.S. Provisional Application No. 61/783,188 filed Mar. 14, 2013, which are hereby incorporated by reference in their entirety.

BACKGROUND

Hybrid vehicles typically have a combustion engine and an eMachine which can act as both an electric motor and a generator. During braking or coasting, such vehicles are capable of capturing and storing the kinetic energy of the vehicle in a battery for later use in propelling the vehicle. This process is commonly referred to as regenerative braking. In some hybrid vehicle architectures, it is possible to disconnect the engine from the transmission at will. Disconnecting the engine when coasting under throttle lift conditions can improve the fuel economy of vehicle. With the engine disconnected and the engine braking effect eliminated, the eMachine can increase the amount of regeneration while still providing a similar braking effort to that with the engine coupled. However, once disconnected, the engine will continue consuming a threshold amount of fuel to maintain its idle state and avoid stalling. The fuel required to maintain the engine at idle when disconnected is lost during coasting and likewise reduces fuel economy. Thus, there is a need for improvement in this field.

SUMMARY

According to one aspect of the disclosure, a method for operating a hybrid vehicle having an engine and an eMachine coupled by a clutch using a hybrid controller is presented. The method determines an idle fuel rate of the engine, determines a hybrid efficiency index for the hybrid vehicle, determines an expected energy storage rate increase for an operating condition where the engine is decoupled from a vehicle transmission using said clutch, multiplies the expected energy storage rate increase by the hybrid efficiency index to determine an expected fuel rate reduction of the engine in the operating condition, and decouples the engine from the vehicle transmission using the clutch if the expected fuel rate reduction is greater than the idle fuel rate.

According to another aspect, a hybrid system is presented, comprising an engine, an eMachine, a transmission operatively coupled to the eMachine, a clutch operatively coupling the engine to the transmission, and a hybrid controller. The hybrid controller may be configured to determine a hybrid efficiency index for the hybrid vehicle, determine an expected energy storage rate increase for an operating condition where the engine is decoupled from the transmission using said clutch, multiply said expected energy storage rate increase by said hybrid efficiency index to determine an expected fuel rate reduction of the engine in said operating condition, and decouple the engine from the transmission using said clutch if the expected fuel rate reduction is greater than said idle fuel rate.

Further forms, objects, features, aspects, benefits, advantages, and embodiments of the present invention will become apparent from a detailed description and drawings provided herewith.

DETAILED DESCRIPTION

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

Figure 1:
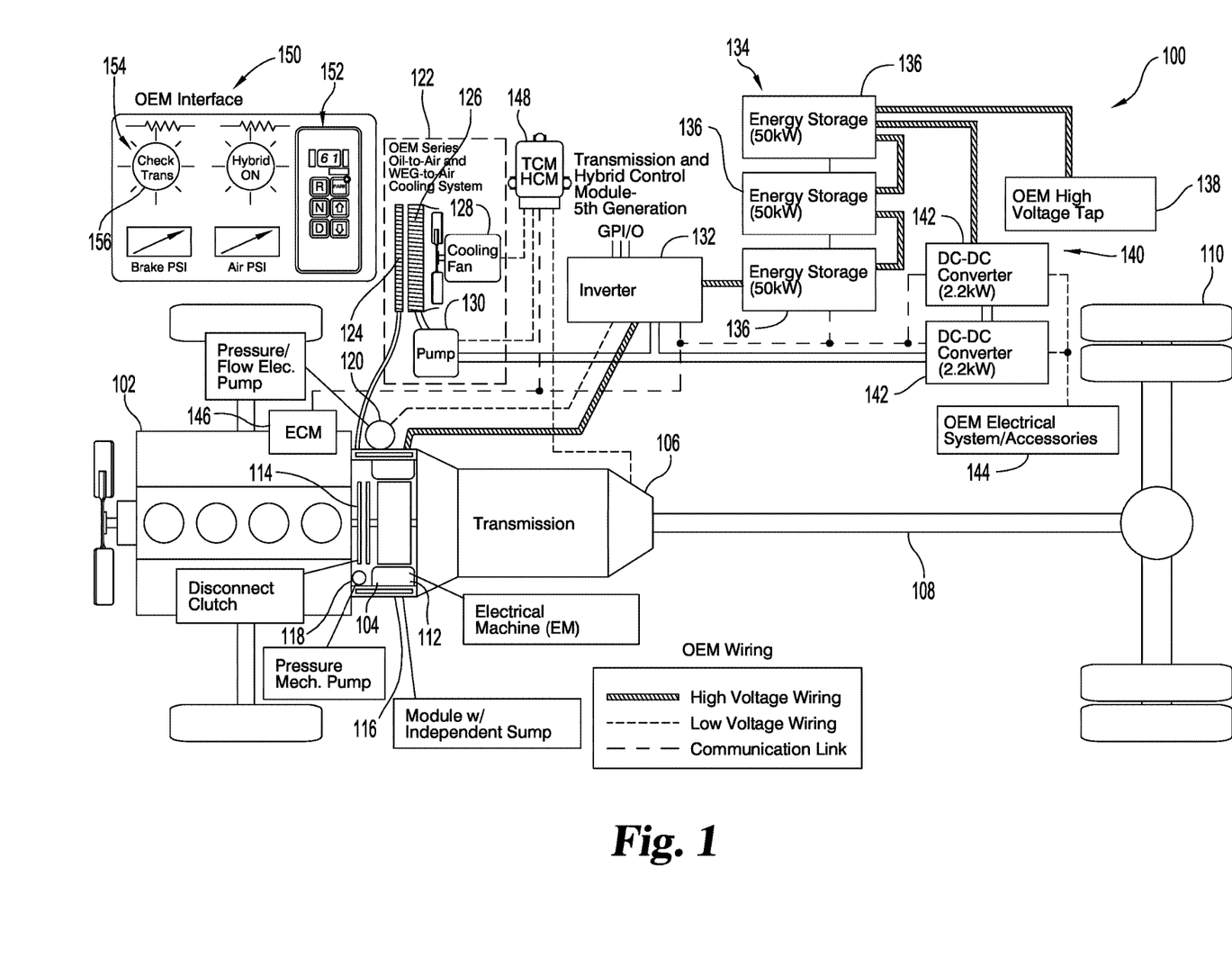
FIG. 1 illustrates a diagrammatic view of one example of a hybrid system.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. In one example, the engine 102 comprises an internal combustion engine having a turbocharger. The turbocharger includes a turbine wheel in the exhaust path of the engine. A shaft connects the turbine wheel to a compressor wheel in the air intake path of the engine. As the turbine wheel is driven by the flow of exhaust gas from the engine, the compressor wheel also spins and compresses the air to the intake of the engine, thereby increasing the power generating capacity of the engine. The hybrid module 104 incorporates a rotating electrical machine, commonly referred to as an eMachine 112, and a clutch 114 that operatively connects and disconnects the engine 102 from the eMachine 112 and the transmission 106.

The hybrid module 104 includes a sump 116 that stores and supplies fluids, such as oil, lubricants, or other fluids, to the hybrid module 104 for hydraulics, lubrication, and cooling purposes. To circulate the fluid, the hybrid module 104 includes a mechanical pump 118 and an electrical (or electric) pump 120.

The hybrid system 100 further includes a cooling system 122 that is used to cool the fluid supplied to the hybrid module 104 as well as the water-ethylene-glycol (WEG) to various other components of the hybrid system 100 which will be described later in further detail. Looking at FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. A cooling fan 128 flows air through both fluid radiator 124 and main radiator 126. A circulating or coolant pump 130 circulates the antifreeze to the main radiator 126.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. The eMachine 112 in one example is an HVH410 series electric motor manufactured by Remy International, Inc. of Pendleton, Ind., but it is envisioned that other types of eMachines can be used. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are connected together, preferably in parallel, to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1. In a typical embodiment, the transmission/hybrid control module 148 and engine control module 146 each comprise a computer having a processor, memory, and input/output connections. Additionally, the inverter 132, energy storage system 134, DC-DC converter system 140, and other vehicle subsystems may also contain computers having similar processors, memory, and input/output connections.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

Figure 2:
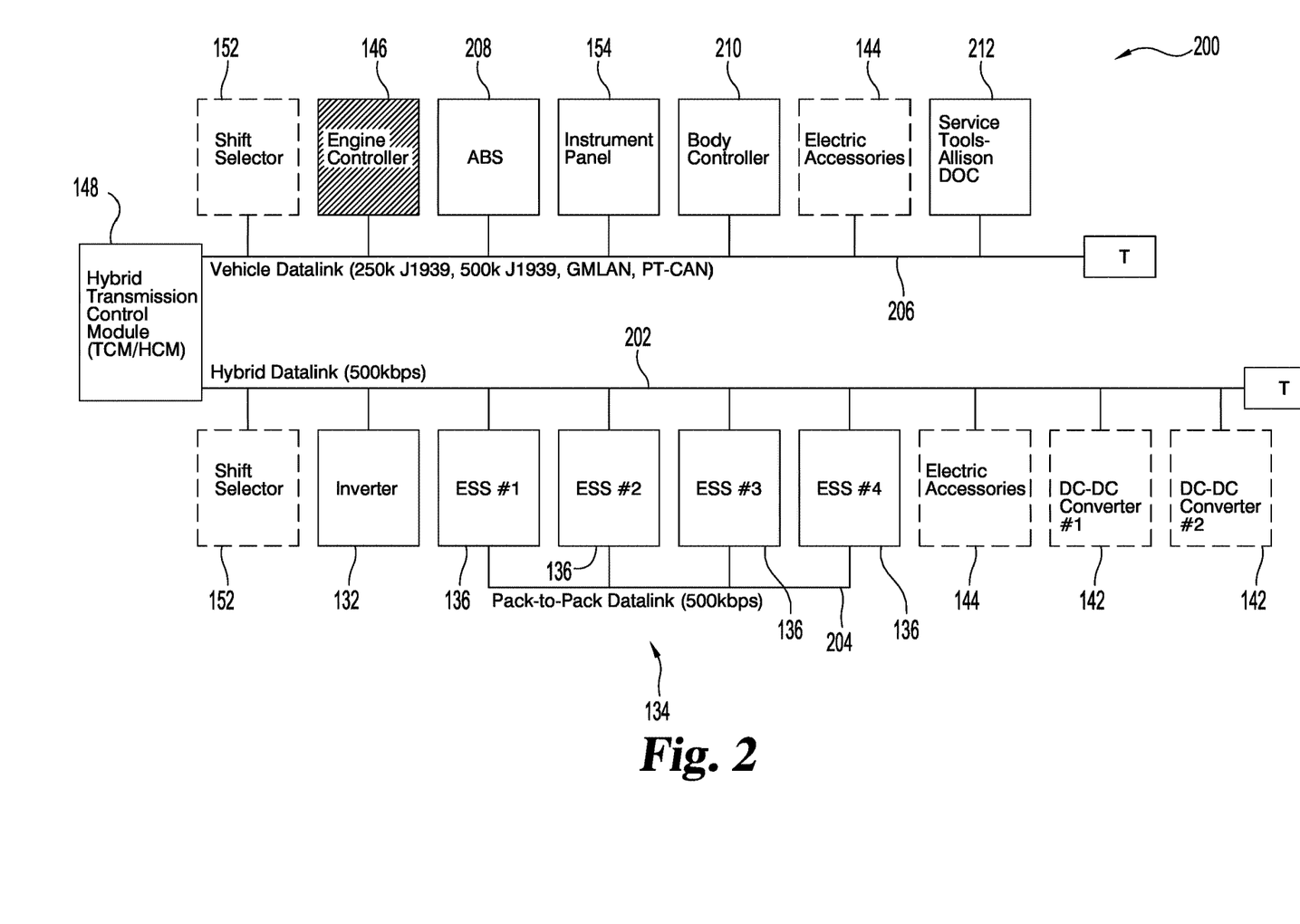
FIG. 2 illustrates a general diagram of an electrical communication system in the FIG. 1 hybrid system.

FIG. 2 shows a diagram of one example of a communication system 200 that can be used in the hybrid system 100. While one example is shown, it should be recognized that the communication system 200 in other embodiments can be configured differently than is shown. The communication system 200 is configured to minimally impact the control and electrical systems of the vehicle. To facilitate retrofitting to existing vehicle designs, the communication system 200 includes a hybrid data link 202 through which most of the various components of the hybrid system 100 communicate. In particular, the hybrid data link 202 facilitates communication between the transmission/hybrid control module 148 and the shift selector 152, inverter 132, the energy storage system 134, the low voltage systems/accessories 144, and the DC-DC converter modules 142. Within the energy storage system 134, an energy storage module data link 204 facilitates communication between the various energy storage modules 136. However, it is contemplated that in other embodiments the various energy storage system modules 136 can communicate with one another over the hybrid data link 202. With the hybrid data link 202 and the energy storage module data link 204 being separate from the data links used in the rest of the vehicle, the control/electrical component of the hybrid system 100 can be readily tied into the vehicle with minimum impact. In the illustrated example, the hybrid data link 202 and the energy storage module data link 204 each have a 500 kilobit/second (kbps) transmission rate, but it is envisioned that data can be transferred at other rates in other examples. Other components of the vehicle communicate with the transmission/hybrid control module 148 via a vehicle data link 206. In particular, the shift selector 152, the engine control module 146, the instrument panel 154, an antilock braking system 208, a body controller 210, the low voltage systems/accessories 144, and service tools 212 are connected to the vehicle data link 206. For instance, the vehicle data link 206 can be a 250 k J1939-type data link, a 500 k J1939-type data link, a General Motors LAN, or a PT-CAN type data link, just to name a few examples. All of these types of data links can take any number of forms such as metallic wiring, optical fibers, radio frequency, and/or a combination thereof, just to name a few examples.

In terms of general functionality, the transmission/hybrid control module 148 receives power limits, capacity, available current, voltage, temperature, state of charge, status, and fan speed information from the energy storage system 134 and the various energy storage modules 136 within. The transmission/hybrid control module 148 in turn sends commands for connecting the various energy storage modules 136 so as to supply voltage to and from the inverter 132. The transmission/hybrid control module 148 also receives information about the operation of the electrical pump 120 as well as issues commands to the electrical pump 120. From the inverter 132, the transmission/hybrid control module 148 receives a number of inputs such as the motor/generator torque that is available, the torque limits, the inverter's voltage current and actual torque speed. Based on that information, the transmission/hybrid control module 148 controls the torque speed and the pump 130 of the cooling system. From the inverter 132, the transmission/hybrid control module 148 also receives a high voltage bus power and consumption information. The transmission/hybrid control module 148 also monitors the input voltage and current as well as the output voltage and current along with the operating status of the individual DC-DC converter modules 142 of the DC-DC converter system 140. The transmission/hybrid control module 148 also communicates with and receives information from the engine control module 146 regarding engine speed, engine torque, engine power, engine power limit, torque curve information, and driver requested output torque, to name a few, and in response controls the torque and speed of the engine 102 via the engine control module 146. It shall be understood that the values being received and calculated by the engine control module 146 may also be received and calculated directly by the transmission/hybrid control module 148. The engine control module 146 and the transmission/hybrid control module 148 may be implanted as separate units or integrated into a single controller or housing.

As discussed above, when the vehicle is decelerating under throttle or coasting conditions, kinetic energy from the vehicle is used to spin the engine 102, with the remaining portion being directed to the energy storage system 134. During this regenerative process, many factors are known including the drag of the engine 102, limits of the eMachine 112 (acting as a generator), and limits on the energy storage modules' 134 ability to accept power.

Two key parameters can also be learned by observation. First, the fuel required to idle the engine 102 can be monitored whenever the engine 102 is at idle. Second, the ratio of fuel saved to electrical energy spent when using the eMachine 112 as a motor to assist in propelling the vehicle (also known as the hybrid efficiency index or HEI) can be calculated. Although the HEI for the vehicle may be known by design, it can also be determined as follows: Whenever energy is being removed from the energy storage system 134 to assist in propulsion of the vehicle, the loss of stored energy is reported to the transmission/hybrid control module 148 by the energy storage system 134 and accumulated. At the same time, the fuel rate required for the engine 102 to produce the same propulsion torque that the combination of the engine 102 and eMachine 112 are producing is determined based on the known fueling rate maps for the engine 102. This value is then compared to the actual fueling rate of the engine 102 (with the eMachine 112 assisting in propulsion) to determine the difference in fueling rate and integrated over time a suitable time T. Equation (1) below illustrates the calculation of the expected HEI:

$$HEI = \frac{\int^T fuelRate_{propulsion} - fuelRate_{engine}}{\int^T EnergyStorageDischargeRate} \quad (1)$$

where: $fuelRate_{propulsion}$=the fuel rate required for the engine to produce the same propulsion torque being currently produced by the combination of the engine and eMachine,
$fuelRate_{engine}$=the current fuel rate of the engine with the eMachine assisting in the propulsion, and
EnergyStorageDischargeRate=the energy storage discharge rate of the energy storage system.

The above information can be utilized to determine if disconnecting the engine 102 from the transmission 106 during a throttle lift condition will result in an overall fuel savings or an overall fuel loss. First, the potential increase in the rate of energy storage is determined. The energy storage rate with the engine 102 disconnected from the transmission 106, subject to the control and physical limitations of all devices in the system is determined and compared to the energy storage rate with the engine 102 coupled to the transmission 106 by clutch 114. Such limitations may include the physical limits of the eMachine 112 (acting as a generator), and the rate and capacity limits of the energy storage system 136. For example, if the energy storage modules 136 are already at full storage capacity, the energy storage rate would not increase by disconnecting the engine 102 since the energy storage modules 136 would be prevented from receiving any additional energy by the hybrid control module 148 or other controller in the energy storage system 134.

Once the potential increase in energy storage rate is determined, it can be multiplied by the HEI to determine the potential fuel rate reduction. If the fuel rate reduction exceeds the fuel rate required to maintain the engine at idle, then decoupling of the engine will lead to an overall reduction in fuel usage and should be performed.

Figure 3:
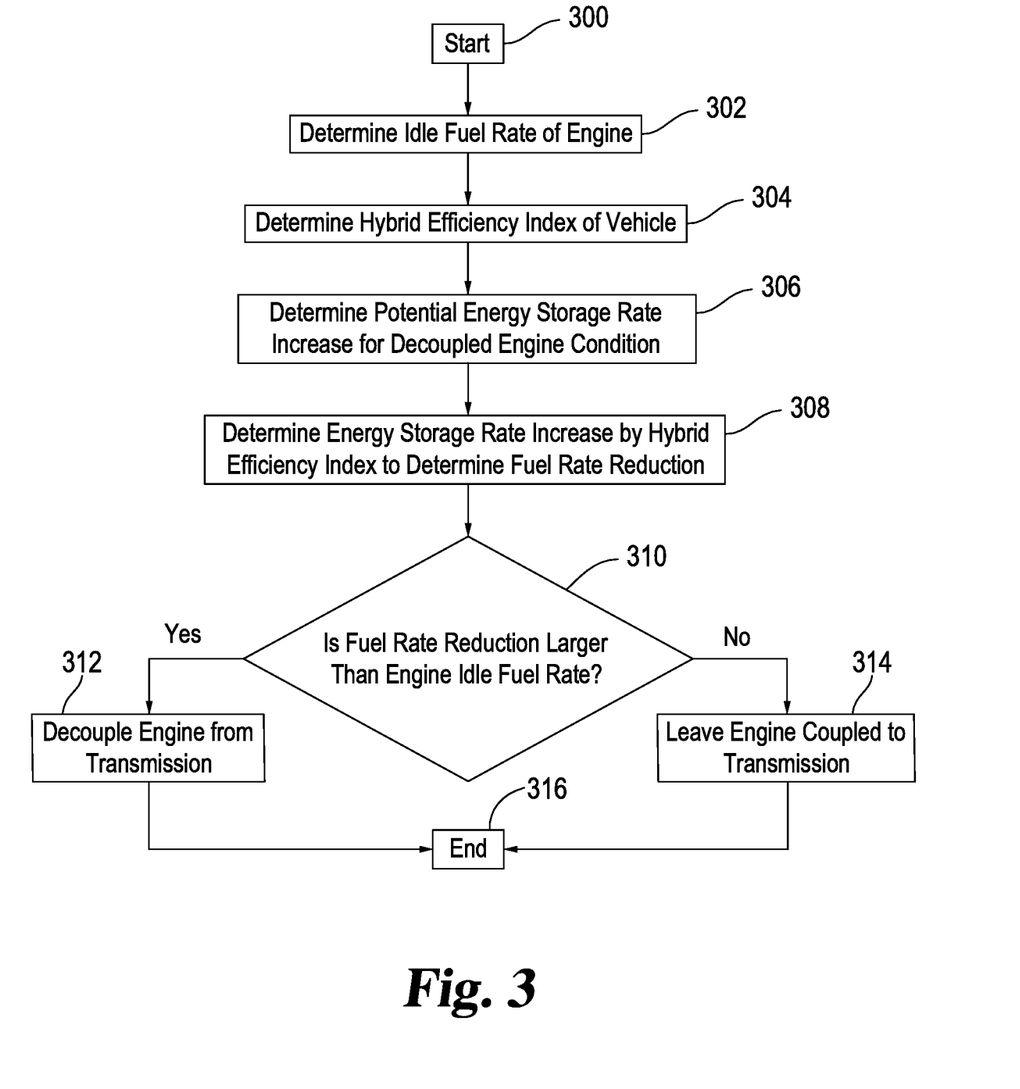
FIG. 3 illustrates a method for operating the hybrid system of FIG. 1 according to one embodiment.

Turning to FIG. 3, a process for implementing the above method using the system 100 is illustrated. The process begins at start point 300 where the hybrid controller 148 determines the idle fuel rate of the engine 102 (stage 302). In one embodiment, the hybrid control module 148 monitors the fuel consumption rate being broadcast by the engine control module 146 during idle periods to adaptively determine an average idle fuel rate of the engine 102 over time.

At stage 304, the control module determines the HEI for the vehicle. Again, the HEI may be previously stored in memory of the hybrid control module 148 based on known vehicle data, or may be adaptively determined based on measured vehicle operational data as discussed above.

At stage 306, the hybrid control module 148 determines the potential increase in the energy storage rate that will occur if the engine is decoupled from the transmission. To accomplish this, the hybrid control module 148 first determines the energy storage rate without the engine coupled, subject to various control and physical limitations of the devices in the system 100. This is compared to the rate of energy storage expected when the engine is coupled to the transmission (accounting for the engine braking effect).

At stage 308, the expected increased energy storage rate is multiplied by the HEI to determine the fuel rate reduction which can be expected if the engine is decoupled from the transmission.

At stage 310, the hybrid control module 248 compares the expected fuel rate savings from stage 308 to the engine idle fuel rate (stage 310). If the expecting fuel rate reduction is greater than the engine idle fuel rate, the hybrid controller disconnects the engine 102 from the transmission 106 using disconnect clutch 114 (stage 312). If the expected fuel savings rate does not exceed the engine idle fuel rate, the engine 102 is left coupled to the transmission 114 (stage 314), with the process ending at end point 316.

It shall be understood that the process of the FIG. 3 may be repeated indefinitely to adaptively update the values for the engine idle fuel rate, the HEI, the energy storage rate increase, the fuel rate reduction, and to couple or decouple the engine 102 from the transmission 106. Additionally, it shall be understood that certain stages of the process may be performed or repeated individually, independent of the other stages.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method for operating a hybrid vehicle having a motor generator and an engine using a hybrid controller, comprising:
    determining an engine-only fuel value representing fuel required to propel the hybrid vehicle in a first mode using the engine alone;
    determining a hybrid fuel value representing fuel required to propel the hybrid vehicle in a second mode using the motor generator as a motor along with the engine to propel the hybrid vehicle;
    determining a fuel saved value by subtracting the hybrid fuel value from the engine-only fuel value;
    determining a hybrid electrical energy value representing electrical energy used to propel the hybrid vehicle in the second mode;
    calculating a Hybrid Efficiency Index (HEI) by determining a ratio of the fuel saved value to the hybrid electrical energy value; and
    using the HEI to control a clutch between the engine and a transmission to decouple the engine from the transmission during a throttle lift condition.

2. The method of claim 1, comprising:
    determining a first energy storage rate for an energy storage system coupled to the motor generator, wherein the first energy storage rate is determined when the engine is disconnected from the transmission;
    determining a second energy storage rate for the energy storage system, wherein the second energy storage rate is determined when the engine is connected to the transmission; and
    calculating a potential fuel rate reduction using the HEI and the first and second energy storage rates.

3. The method of claim 2, comprising
    determining an idle fuel value representing fuel required to idle the engine when the engine is decoupled from the transmission of the hybrid vehicle by the clutch; and
    decoupling the engine from the transmission when the potential fuel rate reduction is greater than the idle fuel value.

4. The method of claim 1, wherein the HEI during a time period T is defined as:

$$\frac{\int^T fuelRate_{propulsion} - fuelRate_{engine}}{\int^T EnergyStorageDischargeRate}$$

where: $fuelRate_{propulsion}$=a fuel rate required for the engine to produce a propulsion torque being currently produced by a combination of the engine and the motor generator;
    $fuelRate_{engine}$=a current fuel rate of the engine with the eMachine assisting in propulsion of the hybrid vehicle; and
    EnergyStorageDischargeRate=an energy storage discharge rate of an energy storage system of the hybrid vehicle.

5. The method of claim 4, wherein the hybrid controller adaptively determines the HEI over the time period T.

6. The method of claim 3, wherein the idle fuel value is determined by the hybrid controller by monitoring the amount of fuel being consumed by the engine when the engine is in an idle operating condition.

7. The method of claim 3, wherein the idle fuel value is determined as an average of a fuel rate of the engine measured over a defined period of time.

8. The method of claim 2, wherein the first energy storage rate accounts for physical limitations of at least one of the motor generator and the energy storage system.

9. The method of claim 2, wherein the first energy storage rate accounts for a current state of charge of the energy storage system.

10. The method of claim 3, wherein the hybrid controller causes the engine to remain coupled to the transmission by the clutch if a current state of charge of the energy storage system is above a predetermined threshold.

11. The method of claim 2, wherein the first energy storage rate accounts for a maximum energy storage rate limit of the energy storage system.

12. The method of claim 2, wherein the second energy storage rate accounts for a braking effect of the engine when coupled to the transmission.

13. The method of claim 1, further comprising:
    maintaining the engine in an idle condition if the engine is decoupled from the transmission.

14. A hybrid system for a hybrid vehicle, comprising:
    an engine;
    a motor generator;
    a transmission operatively coupled to the motor generator;
    a clutch operatively coupling the engine to the transmission; and
    a hybrid controller, the hybrid controller configured to:
        determine an engine-only fuel value representing fuel required to propel the hybrid vehicle in a first mode using the engine alone;
        determine a hybrid fuel value representing fuel required to propel the hybrid vehicle in a second mode using the motor generator as a motor along with the engine to propel the hybrid vehicle;
        determine a fuel saved value by subtracting the hybrid fuel value from the engine-only fuel value;

determine a hybrid electrical energy value representing electrical energy used to propel the hybrid vehicle in the second mode;

calculate a Hybrid Efficiency Index (HEI) by determining a ratio of the fuel saved value to the hybrid electrical energy value; and use the HEI to control the clutch to decouple the engine from the transmission.

15. The system of claim 14, wherein the hybrid controller controls the clutch to decouple the engine from the transmission during a throttle lift condition.

16. The system of claim 14, wherein the hybrid controller is configured to:

determine a first energy storage rate for an energy storage system coupled to the motor generator, wherein the first energy storage rate is determined when the engine disconnected from the transmission;

determine a second energy storage rate for the energy storage system, wherein the second energy storage rate is determined when the engine is connected to the transmission; and calculating a potential fuel rate reduction using the HEI and the first and second energy storage rates.

17. The system of claim 16, wherein the hybrid controller is configured to determine an idle fuel value representing the fuel required to idle the engine when the engine is decoupled from the transmission of the hybrid vehicle by the clutch; and decouple the engine from the transmission when the potential fuel rate reduction is greater than the idle fuel value.

18. The system of claim 14, wherein the HEI during a time period T is defined as:

$$\frac{\int^T fuelRate_{propulsion} - fuelRate_{engine}}{\int^T EnergyStorageDischargeRate}$$

where: $fuelRate_{propulsion}$=a fuel rate required for the engine to produce a propulsion torque being currently produced by a combination of the engine and the motor generator;

$fuelRate_{engine}$=a current fuel rate of the engine with the motor generator assisting in propulsion of the hybrid vehicle; and EnergyStorageDischargeRate=an energy storage discharge rate of an energy storage system of the hybrid vehicle.

19. The system of claim 18, wherein the hybrid controller is configured to determine the HEI over the time period T.

20. The system of claim 17, wherein the idle fuel value is determined by the hybrid controller by monitoring the amount of fuel being consumed by the engine when the engine is in an idle operating condition.

* * * * *